(12) United States Patent
Qian et al.

(10) Patent No.: US 11,488,061 B2
(45) Date of Patent: Nov. 1, 2022

(54) HIGH-DIMENSIONAL DATA NEAREST-NEIGHBOR QUERY METHOD BASED ON VARIABLE-LENGTH HASH CODES

(71) Applicant: Ningbo University, Zhejiang (CN)

(72) Inventors: Jiangbo Qian, Zhejiang (CN); Yanduo Ren, Zhejiang (CN); Yao Sun, Zhejiang (CN); Wei Hu, Zhejiang (CN)

(73) Assignee: Ningbo University, Zhejiang (CN)

(*) Notice: Subject to any disclaimer, the term of this patent is extended or adjusted under 35 U.S.C. 154(b) by 537 days.

(21) Appl. No.: 16/671,181

(22) Filed: Nov. 1, 2019

(65) Prior Publication Data
US 2020/0142897 A1    May 7, 2020

(30) Foreign Application Priority Data
Nov. 2, 2018 (CN) .......................... 201811298578.4

(51) Int. Cl.
| G06F 15/16 | (2006.01) |
| G06N 20/00 | (2019.01) |
| G06F 16/2455 | (2019.01) |
| G06F 17/14 | (2006.01) |
| G06F 16/22 | (2019.01) |

(52) U.S. Cl.
CPC ......... *G06N 20/00* (2019.01); *G06F 16/2255* (2019.01); *G06F 16/24553* (2019.01); *G06F 17/14* (2013.01)

(58) Field of Classification Search
CPC ... G06N 20/00; G06F 17/14; G06F 16/24553; G06F 16/2255

USPC ..................................................... 706/12–13
See application file for complete search history.

(56) References Cited

U.S. PATENT DOCUMENTS

| 6,263,334 | B1* | 7/2001 | Fayyad | ............... | G06F 16/2264 |
| | | | | | 709/202 |
| 6,799,175 | B2* | 9/2004 | Aggarwal | ........... | G06F 16/2425 |
| | | | | | 707/999.005 |
| 9,940,100 | B2* | 4/2018 | Lin | ........................ | G06F 16/319 |
| 2002/0147703 | A1* | 10/2002 | Yu | ........................ | G06F 16/2264 |
| | | | | | 707/999.002 |
| 2011/0302207 | A1* | 12/2011 | Asmundsson | .......... | G06F 16/70 |
| | | | | | 707/E17.014 |
| 2017/0293838 | A1* | 10/2017 | Min | ...................... | G06N 3/0454 |

* cited by examiner

*Primary Examiner* — Bharat Barot
(74) *Attorney, Agent, or Firm* — JCIPRNET

(57) ABSTRACT

A high-dimensional data nearest-neighbor query method based on variable-length hash codes is disclosed. Specifically, in this method, hash codes with the same code frequency are taken as a sub-data set, all the sub-data sets are ranked, a compression ratio is set for each sub-data set, the sub-data sets are compressed and trained according to the compression ratios, and hash codes and original codes corresponding to the trained sub-data sets are obtained; the hash code of each trained sub-data sets is copied to obtain multiple replicas, and the original codes and the corresponding replicas are strung to obtain strung hash codes which are integrated to form a final nearest-neighbor query table; and, a query code is obtained, and the nearest-neighbor query table is searched for a nearest-neighbor data set to complete query. The query efficiency and accuracy are greatly improved according to the invention.

1 Claim, 1 Drawing Sheet

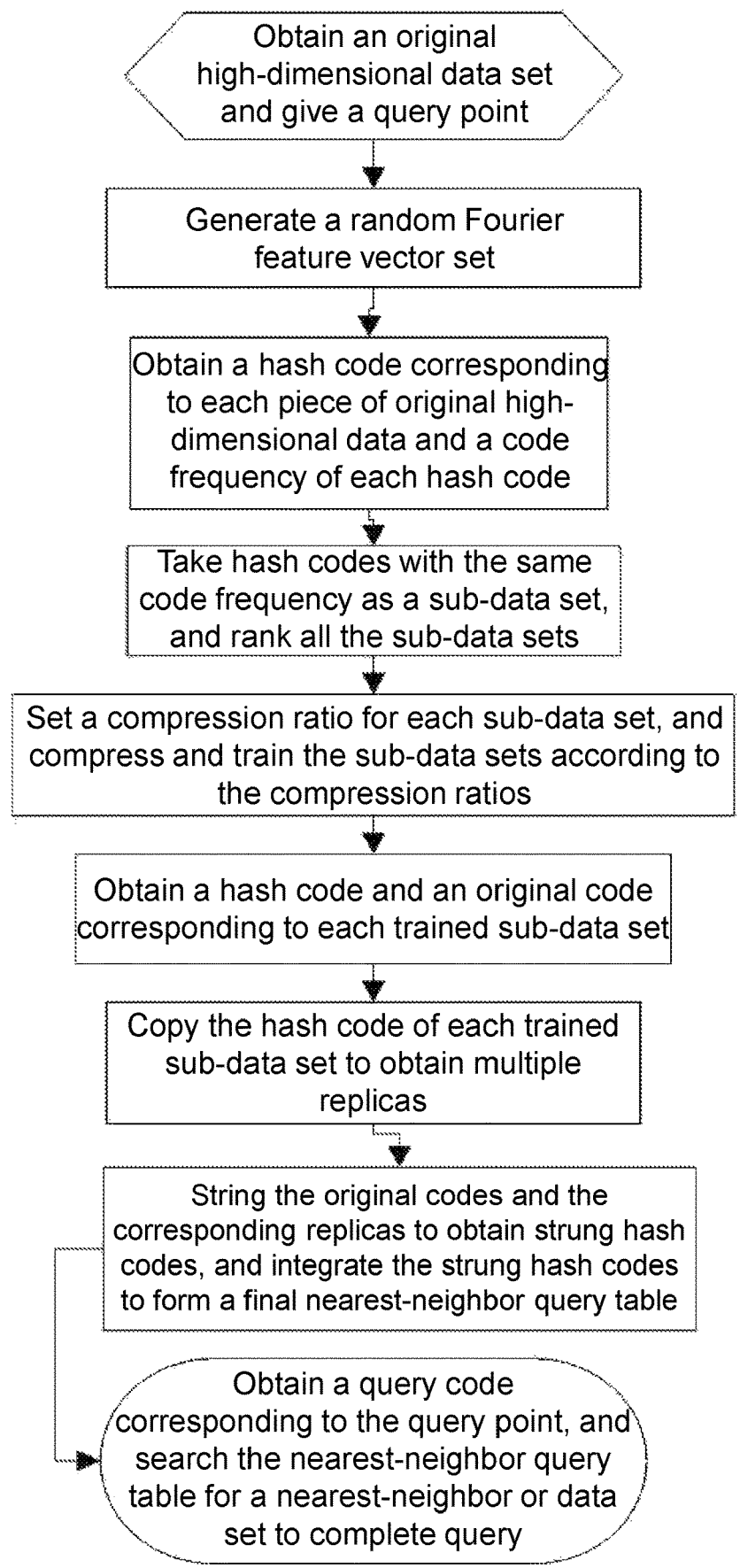

HIGH-DIMENSIONAL DATA NEAREST-NEIGHBOR QUERY METHOD BASED ON VARIABLE-LENGTH HASH CODES

CROSS-REFERENCE TO RELATED APPLICATION

This application claims the priority benefit of China application serial no. 201811298578.4, filed on Nov. 2, 2018. The entirety of the above-mentioned patent application is hereby incorporated by reference herein and made a part of this specification.

BACKGROUND OF THE INVENTION

1. Technical Field

The invention relates to the technical field of information retrieval, in particular to a high-dimensional data nearest-neighbor query method based on variable-length hash codes.

2. Description of Related Art

At present, the hash technology is an effective solution to achieving high-dimensional retrieval on a large scale. In related arts, all data sets adopt unified hash codes, and thus, hash code indexes obtained are low in dimension and consistent in length; and query points are typically processed in the same way as data sets are handled by hash. However, data sets of large-scale high-dimensional data are actually irregularly distributed. Related hash techniques fail to fully utilize the distribution information of the data sets; and meanwhile, due to the small lengths of the query points, it is impossible to reserve more information. In view of this, existing hash techniques are yet to be improved.

BRIEF SUMMARY OF THE INVENTION

The technical issue to be settled by the invention is to provide a high-dimensional data nearest-neighbor query method based on variable-length hash codes so as to reserve data information of query points to the maximum extent, to reduce code redundancies of data sets, and to improve retrieval accuracy.

According to the technical solution adopted by the invention to settle the above technical issue, a high-dimensional data nearest-neighbor query method based on variable-length hash codes comprises the following steps.

(1) Obtaining an original high-dimensional data set including multiple pieces of original high-dimensional data, giving a query point, and carrying out low-dimensional mapping on the original high-dimensional data set to generate a random Fourier feature vector set consisting of random Fourier feature vectors corresponding to the original high-dimensional data.

(2) Carrying out encoding according to a hash value of each random Fourier feature vector to obtain hash codes corresponding to the original high-dimensional data, counting the appearance frequency of each hash code of all the hash codes to obtain a code frequency reflecting the appearance frequency of the hash code, taking hash codes with the same code frequency as a sub-data set to obtain multiple sub-data sets, ranking all the sub-data sets from high to low according to the code frequencies to obtain serial numbers of the sub-data sets, setting a compression ratio for each sub-data set in a manner that the compression ratio is a reciprocal of the code frequency of the sub-data set, compressing the sub-data sets according to the compression ratios to obtain compressed sub-data sets and code lengths of the compressed sub-data sets, and then training the compressed sub-data sets in a manner that the sum of a compression loss and a quantification loss is minimum to obtain trained sub-data sets and hash codes of the trained sub-data sets.

(3) Extracting the random Fourier feature of each trained sub-data set to obtain an original code corresponding to the trained sub-data set, and copying the hash code of each trained sub-data set according to the code length of the corresponding original code and the compression ratio corresponding to the original code to obtain multiple replicas of the hash code of the trained sub-data set.

(4) Stringing the original code of each trained sub-data set and the replicas of the hash code of the trained sub-data set to obtain a strung hash code corresponding to the trained sub-data set, and integrating the strung hash codes corresponding to all the trained sub-data sets to form a final nearest-neighbor query table.

(5) Extracting the random Fourier feature vector of the given query point, mapping the random Fourier feature vector of the given query point to a random Fourier code having a length consistent with that of the strung hash code corresponding to one trained sub-data set, and using the random Fourier code as a query code corresponding to the query point; and finally, searching the final nearest-neighbor query table for a nearest-neighbor data set having a minimum Hamming distance to the query code corresponding to the query point, and using the nearest-neighbor data set as a nearest-neighbor query result of the given query point, so that the nearest-neighbor query process of the given query point is completed.

Compared with the prior art, the invention has the following advantages: first, an original high-dimensional data set is obtained, a query point is given, and low-dimensional mapping is carried out on the original high-dimensional data set to generate a random Fourier feature vector set; second, hash codes corresponding to original high-dimensional data and a code frequency of each hash code are obtained, the hash codes with the same code frequency are taken as a sub-data set to obtain multiple sub-data sets, all the sub-data sets are ranked from high to low according to the code frequencies, a compression ratio is set for each sub-data set in a manner that the compression ratio is a reciprocal of the code frequency of the sub-data set, the sub-data sets are compressed according to the compression ratios, and then compressed sub-data sets are trained in a manner that the sum of a compression loss and a quantification loss is minimum to obtain trained sub-data sets and hash codes of the trained sub-data sets; the random Fourier feature of each trained sub-data set is extracted to obtain an original code corresponding to the trained sub-data set, and the hash code of each trained sub-data set is copied according to the code length of the corresponding original code and the compression ratio corresponding to the original code to obtain multiple replicas of the hash code of the trained sub-data set; the original code of each trained sub-data set and the replicas of the hash code of the trained sub-data set are strung to obtain a strung hash code corresponding to the trained sub-data set, and the strung hash codes corresponding to all the trained sub-data sets are integrated to form a final nearest-neighbor query table; and a random Fourier feature vector of the given query point is mapped to a random Fourier code having a length consistent with that of the strung hash code corresponding to one trained sub-data set, and the random Fourier code is taken as a query code corresponding to the query point; and finally, the final nearest-neighbor query table is searched for a nearest-neighbor data set having a minimum Hamming distance to the query code corresponding to the query point, and the nearest-neighbor data set is used as a nearest-neighbor query result of the given query point, so that the nearest-neighbor query process of the given query point is completed. According to the method, first, more data information is extracted by means of the superiority of random Fourier features in expression of long code information; then, random Fourier codes of the original high-dimensional data set are adaptively compressed according to different code frequencies of the random Fourier codes of the data set in such a manner that a low compression ratio is set for data having a high code frequency and a high compression set is set for data with a low code frequency; afterwards, the query point is encoded by means of the random Fourier feature so as to be quantified into a long code, so that the information of the original data set is reserved as much as possible, distribution information of the data set can be sufficiently mined, and code redundancies are minimized; and meanwhile, the long code of the query point can reserve data information of the query point to the maximum extent, thus, improving the retrieval accuracy.

BRIEF DESCRIPTION OF THE SEVERAL VIEWS OF THE DRAWINGS

FIG. 1 is a flow diagram of all steps of the invention.

DETAILED DESCRIPTION OF THE INVENTION

The invention is further expounded below with reference to the accompanying drawing and embodiments.

A high-dimensional data nearest-neighbor query method based on variable-length hash codes comprises the following steps.

(1) An original high-dimensional data set including multiple pieces of original high-dimensional data is obtained, a query point is given, and low-dimensional mapping is carried out on the original high-dimensional data set to generate a random Fourier feature vector set consisting of random Fourier feature vectors corresponding to the original high-dimensional data;

(2) Encoding is carried out according to a hash value of each random Fourier feature vector to obtain hash codes corresponding the original high-dimensional data, the appearance frequency of each hash code of all the hash codes is counted to obtain a code frequency reflecting the appearance frequency of the hash code, hash codes with the same code frequency are taken as a sub-data set to obtain multiple sub-data sets, all the sub-data sets are ranked from high to low according to the code frequencies to obtain serial numbers of the sub-data sets, a compression ratio is set for each sub-data set in a manner that the compression ratio is a reciprocal of the code frequency of the sub-data set, the sub-data sets are compressed according to the compression ratios to obtain compressed sub-data sets and code lengths of the compressed sub-data sets, and then the compressed sub-data sets are trained in a manner that the sum of a compression loss and a quantification loss is minimum to obtain trained sub-data sets and hash codes of the trained sub-data sets.

(3) The random Fourier feature of each trained sub-data set is extracted to obtain an original code corresponding to the trained sub-data set, and the hash code of each trained sub-data set is copied according to the code length of the corresponding original code and the compression ratio corresponding to the original code to obtain multiple replicas of the hash code of the trained sub-data set.

(4) The original code of each trained sub-data set and the replicas of the hash code of the trained sub-data set are strung to obtain a strung hash code corresponding to the trained sub-data set, and the strung hash codes corresponding to all the trained sub-data sets are integrated to form a final nearest-neighbor query table.

(5) The random Fourier feature vector of the given query point is extracted and is mapped to a random Fourier code having a length consistent with that of the strung hash code corresponding to one trained sub-data set, and the random Fourier code used as a query code corresponding to the query point; and finally, the final nearest-neighbor query table is searched for a nearest-neighbor data set having a minimum Hamming distance to the query code corresponding to the query point, and the nearest-neighbor data set is used as a nearest-neighbor query result of the given query point, so that the nearest-neighbor query process of the given query point is completed.

What is claimed is:

1. A high-dimensional data nearest-neighbor query method based on variable-length hash codes, comprising:
    a processor, configure to:
    (1) obtain an original high-dimensional data set including multiple pieces of original high-dimensional data, give a query point, and carrying out low-dimensional mapping on the original high-dimensional data set to generate a random Fourier feature vector set consisting of random Fourier feature vectors corresponding to the original high-dimensional data;
    (2) carry out encoding according to a hash value of each said random Fourier feature vector to obtain hash codes corresponding to the original high-dimensional data, count the appearance frequency of each hash code of all the hash codes to obtain a code frequency reflecting the appearance frequency of the hash code, take hash codes with a same code frequency as a sub-data set to obtain multiple sub-data sets, rank all the sub-data sets from high to low according to the code frequencies to obtain serial numbers of the sub-data sets, set a compression ratio for each said sub-data set in a manner that the compression ratio is a reciprocal of the code frequency of the sub-data set, compress the sub-data sets according to the compression ratios to obtain compressed sub-data sets and code lengths of the compressed sub-data sets, and then train the compressed sub-data sets in a manner that the sum of a compression loss and a quantification loss is minimum to obtain trained sub-data sets and hash codes of the trained sub-data sets;
    (3) extract a random Fourier feature of each said trained sub-data set to obtain an original code corresponding to the trained sub-data set, and copy the hash code of each said trained sub-data set according to a code length of the corresponding original code and the compression ratio corresponding to the original code to obtain multiple replicas of the hash code of the trained sub-data set;
    (4) string the original code of each said trained sub-data set and the replicas of the hash code of the trained sub-data set to obtain a strung hash code corresponding to the trained sub-data set, and integrating the strung hash codes corresponding to all the trained sub-data sets to form a final nearest-neighbor query table; and (5) extract a random Fourier feature vector of the given query point, map the random Fourier feature vector of the given query point to a random Fourier code having a length consistent with that of the strung hash code corresponding to one said trained sub-data set, use the random Fourier code as a query code corresponding to the query point; and finally, search the final nearest-neighbor query table for a nearest-neighbor data set having a minimum Hamming distance to the query code corresponding to the query point, and use the nearest-neighbor data set as a nearest-neighbor query result of the given query point, so that the nearest-neighbor query process of the given query point is completed.

* * * * *